US012500898B2

(12) United States Patent
Gero et al.

(10) Patent No.: US 12,500,898 B2
(45) Date of Patent: Dec. 16, 2025

(54) PROOF OF WORK AS AN AUTHORIZATION SIGNAL

(71) Applicant: Akamai Technologies, Inc., Cambridge, MA (US)

(72) Inventors: Charles E. Gero, Quincy, MA (US); Vishal A. Patel, Billerica, MA (US); David Tang, Cambridge, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 24 days.

(21) Appl. No.: 18/544,036

(22) Filed: Dec. 18, 2023

(65) Prior Publication Data

US 2025/0202905 A1    Jun. 19, 2025

(51) Int. Cl.
*H04L 9/40*    (2022.01)

(52) U.S. Cl.
CPC ................... *H04L 63/108* (2013.01)

(58) Field of Classification Search
CPC .................................................... H04L 63/108
See application file for complete search history.

(56) References Cited

U.S. PATENT DOCUMENTS

| 9,906,552 | B1 | 2/2018 | Brown et al. |
| 10,116,693 | B1* | 10/2018 | Robinson ............. H04L 9/3239 |
| 2007/0011453 | A1 | 1/2007 | Tarkkala et al. |
| 2017/0244709 | A1 | 8/2017 | Jhingran et al. |
| 2020/0285731 | A1* | 9/2020 | Thom ..................... G06F 21/44 |
| 2022/0027352 | A1 | 1/2022 | Teodor et al. |

FOREIGN PATENT DOCUMENTS

| JP | 2008545353 A | 12/2008 |
| KR | 1020210102282 A | 8/2021 |
| WO | 2019169048 A1 | 9/2019 |

OTHER PUBLICATIONS

Chakraborty, Trisha, et al. "AI_Adaptive_POW: An AI assisted Proof of Work (POW) framework for DDOS defense." Software Impacts 13: 100335. (Year: 2022).*
Ordi, Ali, et al. "A novel proof of work model based on pattern matching to prevent DOS attack." Digital Information and Communication Technology and Its Applications: International Conference, DICTAP 2011, Dijon, France, Jun. 21-23, 2011. Proceedings, Part I. Springer Berlin Heidelberg. (Year: 2011).*
Alphand, Olivier, et al. "IoTChain: A blockchain security architecture for the Internet of Things." 2018 IEEE wireless communications and networking conference (WCNC). IEEE. (Year: 2018).*
PCT/US2024/060647, International Search Report and Written Opinion mailed on Apr. 17, 2025, 9 pages.

* cited by examiner

*Primary Examiner* — John M MacIlwinen
(74) *Attorney, Agent, or Firm* — David H. Judson

(57) ABSTRACT

Methods for implementing Proof of Work (PoW) as an authorization signal are provided in a multi-node distributed operating environment wherein a set of authorization proxies are used to control access to protected resources. Each authorization proxy is enabled to provide PoW challenges to requesting clients. The methods enforce the constraint that PoW can only be exchange for access once. The approach thus prevents replays of PoW, e.g., wherein a client could do the work and then use that PoW for access multiple times, or a nefarious user could steal the PoW from another client to gain access to the protected resource.

16 Claims, 4 Drawing Sheets

PROOF OF WORK AS AN AUTHORIZATION SIGNAL

BACKGROUND

Technical Field

This disclosure relates generally to authentication and authorization technologies, products and services.

Background of the Related Art

The concept of Proof of Work (PoW) was first invented in 1993 by Moni Naor and Cynthia Dwork in order to deter denial-of-service attacks and other service abuses. Their concept was published as part of "Pricing via Processing or Combatting Junk Mail." In 1999, the term Proof of Work was coined and formalized by Markus Jakobsson and Ari Juels in "Proof of Work and Bread Pudding Protocols." This concept has gained even more popularity with the advent of cryptocurrency and Bitcoin, which often use it as a means of mining. The core foundation for Proof of Work is an asymmetry in work, wherein the work that must be performed by the requester is hard and intensive (computationally and/or memory), but easy for a verifier to validate. The work or problem that the requester has to perform must be solvable and not intractable.

Access control over a computer network is a well-developed art. In a typical and simplified operating scenario, a client wishes to access a protected resource, such as an application; in order to do so, the client must go through a network-accessible authorization proxy. The authorization proxy ensures that the client meets the necessary criteria to be allowed, which is typically based on some set of signals, most often comprising some set of user based information such as, but not limited to: username, user location, user IP address, time-of-day, and the like. Naor and Dwork's paper introduced using PoW as one such signal and, in particular, the notion of requiring "a user to compute a moderately hard, but not intractable, function in order to gain access to the resource."

BRIEF SUMMARY

Methods for implementing Proof of Work (PoW) as an authorization signal are provided, e.g., in a multi-node distributed operating environment wherein a set of authorization proxies are used to control access to protected resources. Each authorization proxy is enabled to provide PoW challenges to requesting clients. The methods herein enforce the constraint that PoW can only be exchange for access to a protected resource once. The approach prevents replays of PoW, e.g., wherein a client could do the work and then use that PoW for access multiple times, or a nefarious user could steal the PoW from another client to gain access to the resource.

The foregoing has outlined some of the more pertinent features of the subject disclosure. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

Figure 1:
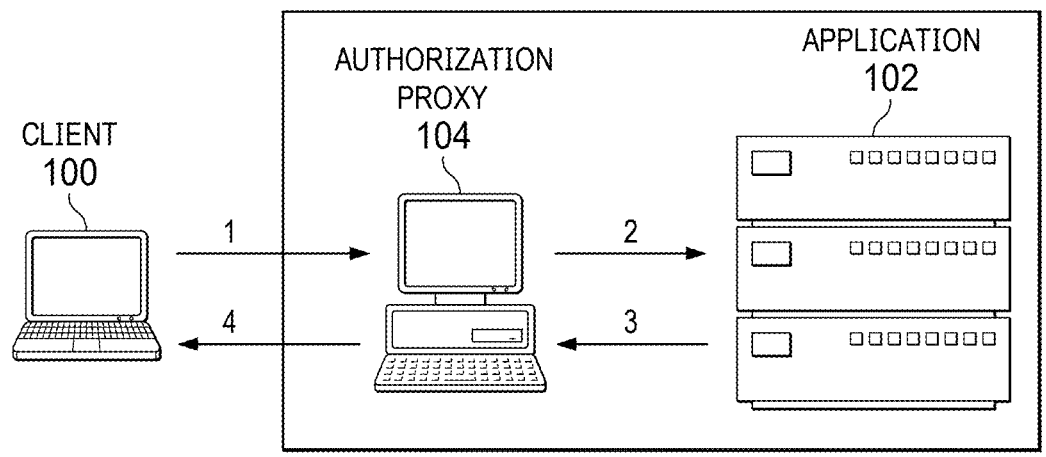
FIG. 1 depicts an access control method that is known in the prior art.

FIG. 1 depicts a representation access control method over a network that is known in the art. In this simplified example, a client 100 seeks access to a protected resource or endpoint, such as application 102, and an authorization proxy 104 is used to manage such access. In this example, the client makes a request at step (1) that is received by the authorization proxy 104, depending on how the network is configured. If the authorization proxy 104 determines that appropriate authorization exists, the request is forwarded to the application 102 at step (2). At step (3), the application 102 returns a response to the authorization proxy 104, and that response is then passed back to the requesting client at step (4). The access control method depicted in FIG. 1 is simplified, and there may be many known variants, e.g., the response generated by the application may be delivered to the requesting client without passing back through the proxy 104. Further, the nature and scope of the authorization may include user authentication or other requirements, e.g., depending on configuration or policy.

Figure 2:
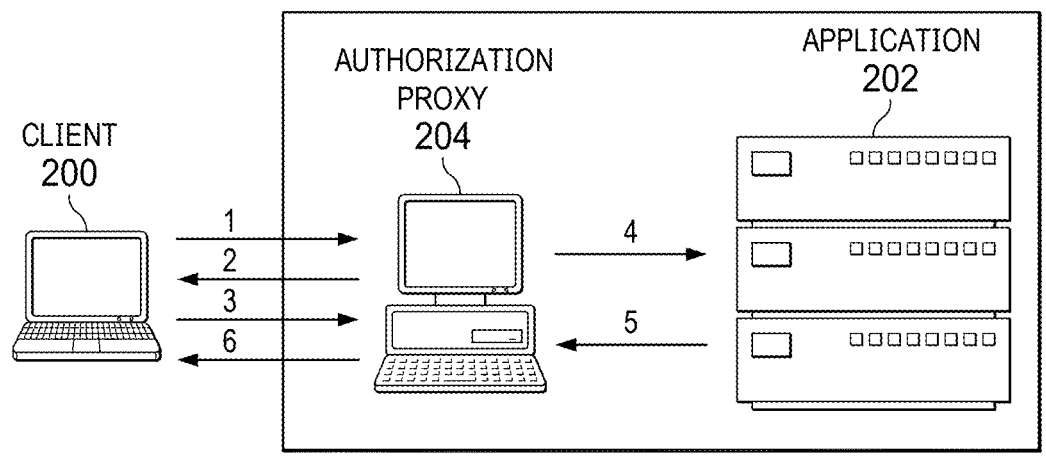
FIG. 2 depicts the access control method of FIG. 1 augmented to include PoW.

An example additional requirement is the notion of the authorization proxy requiring some Proof Of Work, as is depicted in FIG. 2, also depicted as prior art. In this embodiment, client 200 seeks access to the protected endpoint (namely, application 202), once again through an authorization proxy 204. Thus, client 200 makes a request that is received by the proxy 204 at step (1). At step (2), the proxy 204, and in lieu of performing the authorization at this point, requests the client 200 to perform some work. This is step (2). At step (3), and in response to the PoW challenge from the proxy 204, and if it has performed the necessary work, the client returns to the proxy 204 an indication that the work has been completed, together with the results of the work. The authorization proxy 204 then validates that the PoW has been done as requested and continues to attempt to validate the client (or the user associated therewith). Upon validating the client, the authorization proxy 204 moves forward with the application request at step (4). At step (5), the application returns a response to the proxy 204, which then passes that response back to the requesting client at step (6) to complete the process.

Proof of Work as an Authorization Signal

With the above as background, the techniques of this disclosure are now described.

Figure 3:
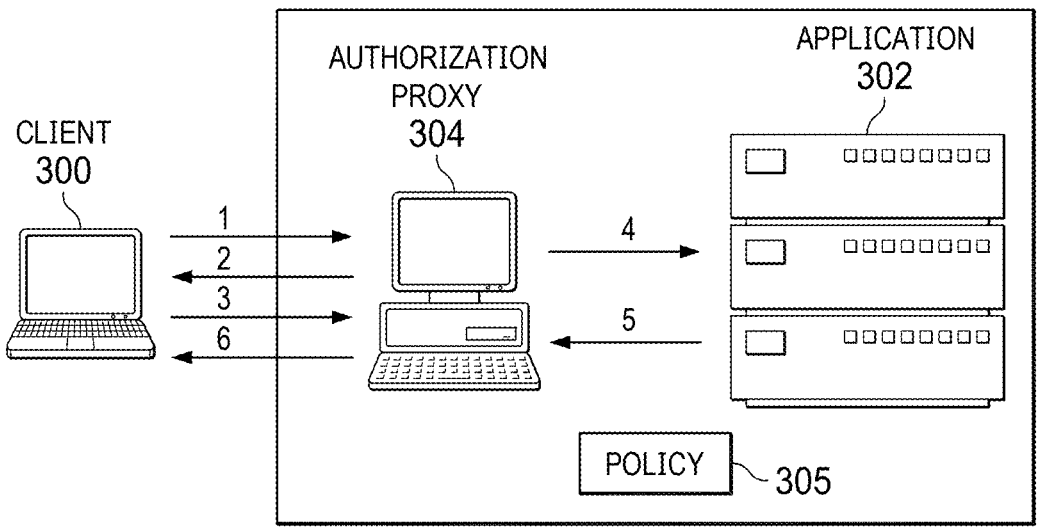
FIG. 3 depicts an access control method of this disclosure depicting the use of PoW as an authorization signal.

In a first operating scenario, Proof of Work is used to identify a specific user or a class of users, but preferably without explicit user signals being involved. With reference to FIG. 3, which is representative but non-limiting, a client 300 seeks access to a protected resource 302, in this case a source code version control repository (e.g., Perforce, GitHub, or the like). It is assumed that the version control repository is meant to be accessed by given individuals, e.g., software developers in a particular organization or enterprise. Conversely, the repository (and its assets) are presumed to be restricted and thus not available to other individuals associated with the organization, such as HR, Sales, Marketing, etc. staff. Further, the organization provides its employees different machines, e.g., the developers are assigned machines with greater capabilities in terms of computation (e.g., faster processors, more memory, graphics processing unit (GPU) support, etc.) as compared to the machines deployed to non-developers. The organization then establishes an authorization policy that includes a PoW authorization that is used to enforce developer-only access to the version control repository 302. The PoW authorization has a time window that only the developer machines can satisfy. The time window typically is explicit, but it may also be a value that is inherent based on the nature of the requested work. The authorization then proceeds as indicated in FIG. 3. In this scenario, client 300 is a machine that seeks access to the protected endpoint (namely, the version control repository application 302), through the authorization proxy 304 that support an authorization policy 305 having a PoW. Thus, client 300 makes a request that is received by or at the proxy 304 at step (1). At step (2), the proxy 304, and in lieu of performing the authorization at this point, requests the client 300 to perform some work having a time window (computation deadline) that can only be met by well-provisioned machines. This is step (2). At step (3), and in response to the PoW challenge from the proxy 304, and if it has performed the necessary work and within the required time window, the client returns to the proxy 304 an indication that the work has been completed, once again together with the results of the work. The authorization proxy 304 then validates that the PoW has been done as requested and continues to attempt to validate the client (or the user associated therewith). Upon validating the client (or the client user, as the case may be), the authorization proxy 304 moves forward with the application request at step (4). At step (5), the application returns the response to the proxy 304, which then passes that response back to the requesting client at step (6) to complete the process.

Thus, in the scenario depicted in FIG. 3, the PoW works not only as an authorization signal, but also as a form of authentication to uniquely identify the class of the developer machines that are capable of meeting the work challenge within the time window. As a variant, the PoW may also be coupled with one or more other signals that are bound to a specific machine, e.g., to determine deviations in health of that machine, or that can be used to verify that the specific machine is configured in a certain manner (e.g., that a given software patch previously delivered indeed is present), and so forth. Thus, in the event the authorization proxy cannot also verify one or more of those additional signals (e.g., because some other machine is involved), permitted access can be declined.

Figure 4:
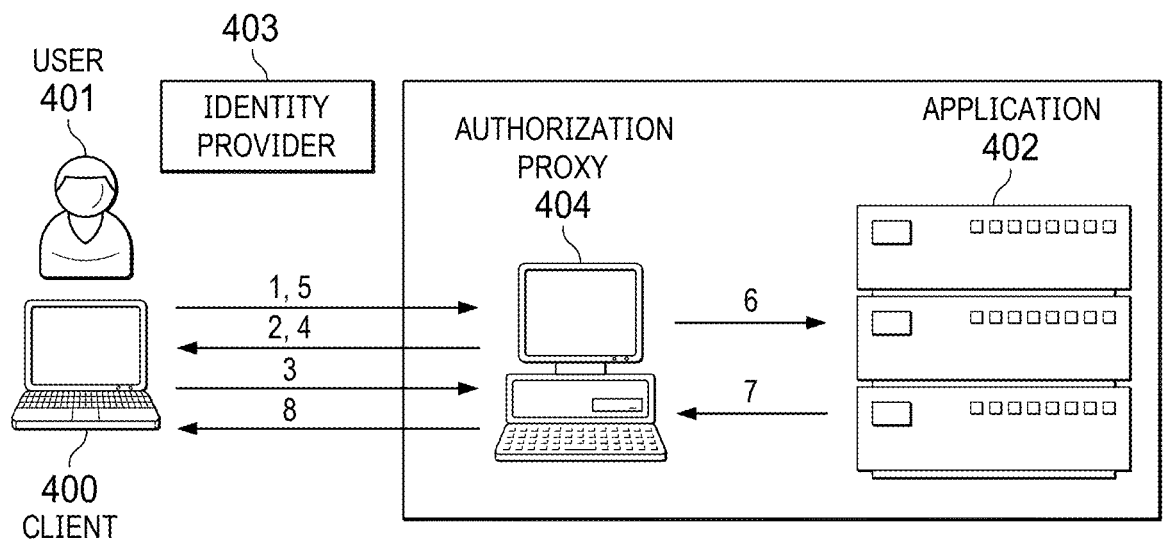
FIG. 4 depicts a variant of the access control method in FIG. 3 wherein a PoW challenge includes additional signal associated to the client device.

An example of this latter scenario is depicted in FIG. 4. In this example, assume that a user 401 authenticates himself/herself via an Identity Provider (IdP) 403 and uses a specific machine 400 that has the capability to complete some work in some mean time X. The user 401 seeks access to a protected resource 402, once again in association with an authorization proxy 404. In this example, and because the IdP is used for authenticating the user directly, the authorization proxy enforces the PoW authorization policy. Now, assume that the machine 400 is running malware or running some background CPU and/or memory intensive task (whether good or bad) and that, as a result, the PoW challenge completes in some mean time Y. This deviation (the difference between mean times X and Y) may then be used to identify that the client machine is behaving suspiciously and needs further investigation, or that the user should have additional step-up authentication such as multifactor authentication (MFA). Additionally, it may also be that the machine in question is entirely different from the original machine and that the user's identity has been stolen or compromised, in which case preferably a step-up authentication is triggered. In this sense, the PoW is an additional signal that strengthens other signals, such as identity. As depicted, client 400 makes a request that is received by the proxy 404 at step (1). At step (2), the proxy 404 requests the client 400 to perform some work having the time window that includes mean time X but not Y. This is step (2). At step (3), and in response to the PoW challenge from the proxy 404, and at mean time Y, the client returns to the proxy 404 an indication that the work has been completed, once again together with the results of the work. Because mean time Y is too long (in this example), the authorization proxy 404 instructs the client 400 at step (4) that an additional step-up authentication is required. To that end, client then returns to the IdP 403 and an MFA (or other authentication) is carried out. Upon a successful step-up, the client returns to the proxy at step (5), typically via a redirect. The authorization proxy 404 validates the PoW and the step-up authentication and then moves forward with the application request at step (6). At step (7), the application returns the response to the proxy 404, which then passes that response back to the requesting client at step (8) to complete the process. Although not depicted, the response delivered by the machine may be so far outside of the time window (e.g., mean time Z>>Y>>X) such that the proxy does not even send the request for the step-up authentication.

Figure 5:
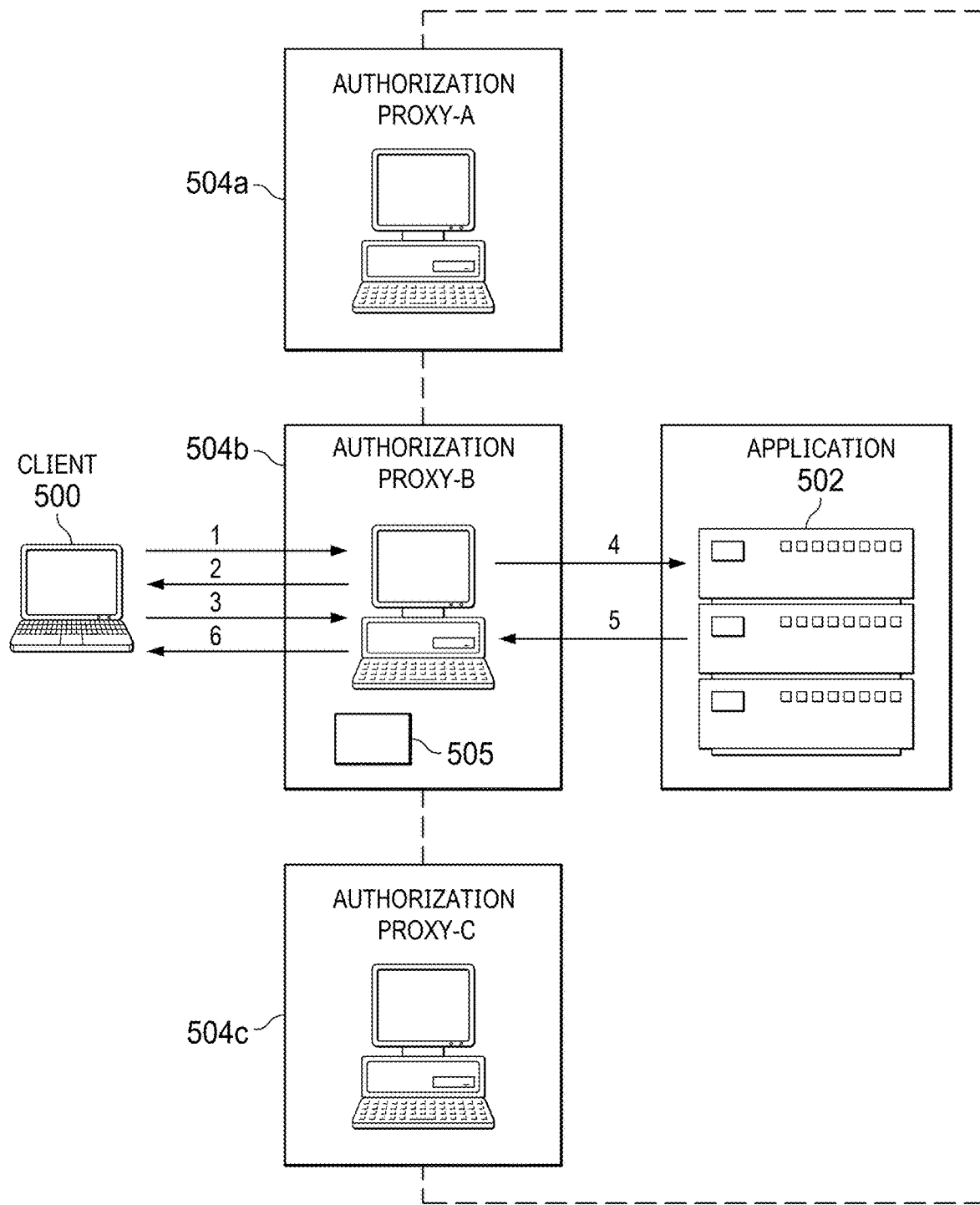
FIG. 5 depicts a multi-node operating environment in which a set of authorization proxies each have responsibility for issuing and enforcing PoW challenges.

PoW as an Authorization Signal in a Multi-Node Distributed Operating Environment The techniques described herein have particular utility in the context of a multi-node distributed operating environment wherein there are a set of authorization proxies. In particular, in this operating scenario, the protected endpoint is fronted by multiple authorization proxies. According to the techniques herein, each authorization proxy is configured to issue work challenge(s), and further that any response to a particular work challenge received at a proxy must be associated with a challenge issued by that proxy (but not any other proxy in the set). In other words, PoW verification is restricted to the same node that generates the challenge in the first instance. This restriction (to the same node) provides significant advantages in that the PoW can only be exchanged for access once. It prevents replays of PoW such that a client could do the work and then use that PoW for access multiple times, or the situation where a nefarious user steals the PoW from another client to gain access. Stated another way, and in this distributed proxy environment, the PoW must be completed for each and every access. This example is further illustrated below in FIG. 5.

In this example, the protected endpoint 502 is fronted by a set of authorization proxies 504a, 504b and 504c. It is assumed that the user of the client machine 500 seeks access to the protected endpoint, namely, application 502. In this example, and at step (1), the client 500 requests access to the resource 502. At step (2), authorization proxy 504b responds with work to be completed along with a data blob 505 to be submitted as part of that work. The data blob 505 uniquely identifies authorization proxy 504b as well as contains a signature over the identity of proxy 504b and the PoW request, such that when the PoW is completed, the client provides the requested work and the blob 505 when it responds at step (3). Without intending to be limiting, the data blob may be a cryptographic signature or HMAC utilizing secret information known only to the authorization servers. The blob ensures on PoW response submission that the given work really was requested from an authorized authorization proxy, and it provides for replay prevention, as further explained below. If the blob 505 is not provided (or if another blob that is not blob 505 is provided), the proxy takes a given action, e.g., depending on its configuration. One action is that the proxy 504b denies or sandboxes the request. Another action is that the proxy re-requests work to be performed. As noted above, in this multi-authorization proxy node example, the authorization proxies preferably ensure that the response is for a valid request prior to verifying the client's work. Thus, and with reference back to FIG. 5, authorization proxy 504b verifies the blob 505 and then, at step (4) forwards the original request to the backend, namely, the endpoint. At step (5), the application 502 returns a response to the proxy, which then forwards that response to the requesting client at step (6).

Additionally, any proxy in place of 504b also can perform the same actions from step (3) onward, thereby allowing for flexible load balancing.

As noted, the nature of the action taken by a proxy that cannot verify its authority for handling the PoW response received from a requesting client is implementation-specific and may include one of more of: denying access or sandboxing the request, requesting new work, issuing a notification, redirecting the client back to another proxy, and the like.

Figure 6:
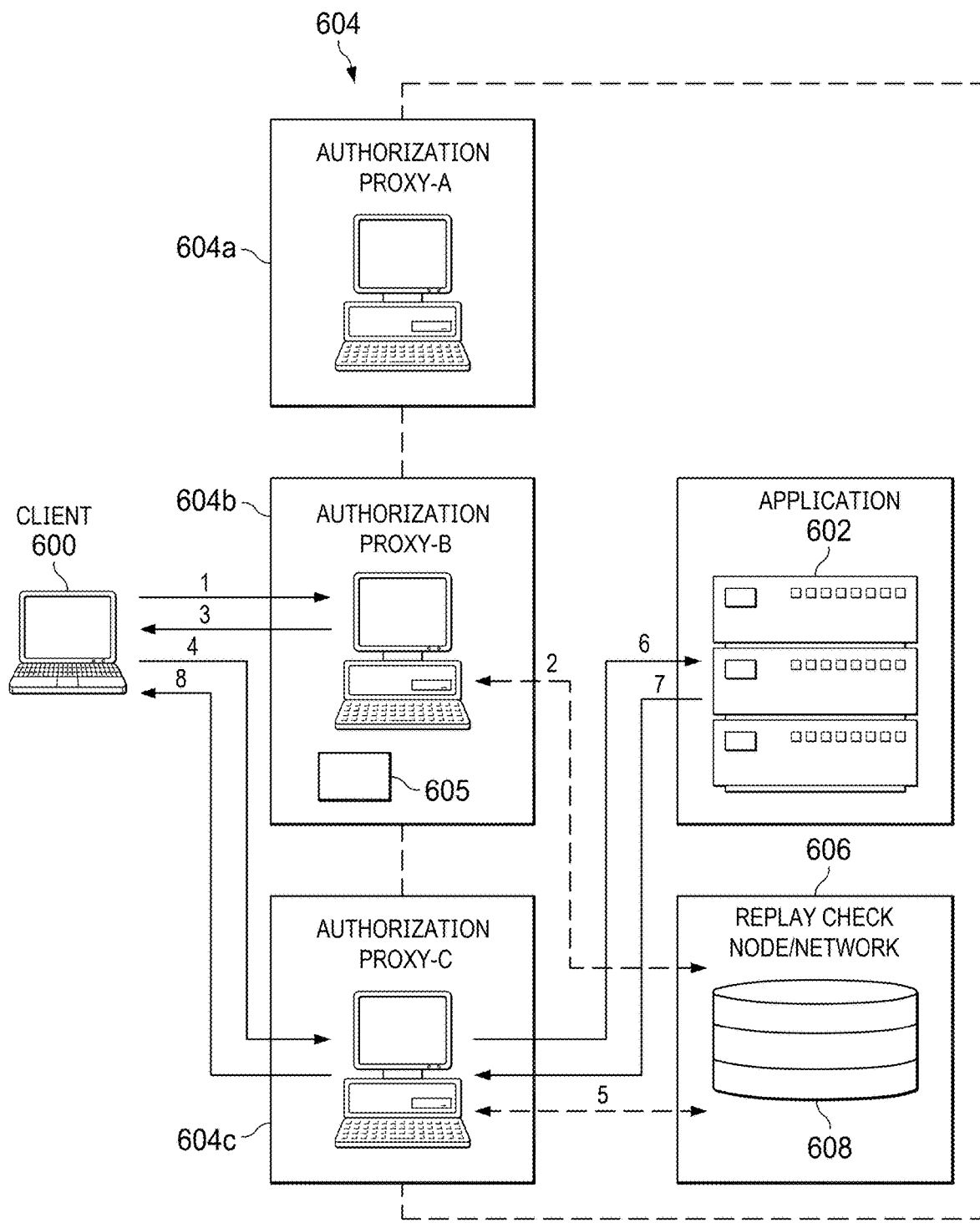
FIG. 6 depicts a variant of the multi-node operating environment that includes a dedicated replay check node.

FIG. 6 depicts yet another operating scenario, namely, a multi-node environment supporting multiple authorization proxies and wherein the architecture supports convergence of the PoW onto a single node or network for the purpose of the above-noted replay checks. As depicted, and in this embodiment, the multiple authorization proxies 604, namely, 604a, 604b and 604c, are associated with a replay check node or network 606. The replay check node 606 may be a single instance or machine, a network, or some form of a database. As depicted, the replay check node has a pending work queue 608 that includes an identification of each PoW issued. The identification typically includes metadata such as timestamp, an identifier associated with the authorization proxy node that issued the challenge, the work request itself, and the like. Similar to the above-described distributed environment and operation (FIG. 5), client 600 is requesting access to protected resource, e.g., application 602, via any one of the proxies 604. In a typical operating environment, the proxies are associated with a load balancer (not shown). As also previously described, each proxy 604 is configured to issue PoW challenges, and to respond to responses to those challenges. According to this embodiment, the notion of converging a given PoW to a single node (as described below) provides significant further advantages in that it prevents PoW replays that would allow a client to do the work and then use that PoW for access multiple times, or that would enable a nefarious user stealing the PoW from another client to gain access. By converging the PoW to a single node, the distributed authorization proxy nodes notify the replay check node 606 that work has been requested at some timestamp; when the PoW is returned to a proxy node, that node also can notify the replay check node 606 node to ensure that that work was actually requested. The replay check node can then invalidate that work for future attempts, e.g., by removing it from the pending queue 608.

In operation, and referring back to FIG. 6, at step (1) the client 600 makes a request to the application 602 that is received by authorization proxy 602b. In this scenario, and prior to responding with the work to be done, the proxy first shares the work to be done along with other potential metadata to the replay check node 606. This is step (2). Step (2) may occur out-of-band from the request processing workflow. As noted, typically the metadata may include data that uniquely identifies the particular work request, such that the work request can be later identified (or retrieved again). At step (3), and like in the FIG. 5 embodiment, the authorization proxy 604b responds back to the client with the work to be performed along with a data blob 605, such that the request can be looked up again in the replay check node. Assume now that the client finishes the work and forwards its response to the PoW challenge. In this case, however, and because the proxies sit behind other services (e.g., DNS, load balancing or the like), the response from the client (including the result of the work, and the data blob 605) is received by a different proxy, namely, authorization proxy 604c. This is step (4). At step (5), the authorization proxy 604c communicates with the replay check node 606 to determine whether the data blob 605 that it received can be validated. Typically, this validation involves the replay check node checking its queue of pending work to determine whether the work was actually requested and by which node, as well as whether the work response was itself received within the required time window. If so (i.e., if the blob and PoW response are valid because they relate to an outstanding PoW challenge as represented in the queue), authorization proxy 604c continues at step (6) to forward the request to the application 602. At step (7), the application then returns the result back to the authorization proxy 604c, which in turn forwards the application response to the requesting client at step (8) to complete the process. Although not depicted, in the event the replay check fails, e.g., because the work was not requested, because the data blob is not associated with work that was requested, because the PoW response was not timely received, or otherwise), the authorization proxy 604c takes a given action, such as denying the access request. As noted, the given action is based on a configuration for that proxy.

Thus, in this embodiment, the authorization proxy that receives a response to a PoW notifies the replay check node to ensure that the work was actually requested (and by which proxy). This enables the system to invalidate the PoW against future attempts and, in particular, by removing it from the replay check node's pending work queue.

In an alternate embodiment, the role of the replay check node can be sharded across the authorization servers themselves. Recall that the blob returned with a response contains identifying information of the originally reached authorization server. Upon receiving a response to a POW request along with the original blob, an authorization proxy can forward the replay check to the original server instead of a separate centralized replay check system. This allows for infinite horizontal scaling of the replay check functionality along with the authorization servers themselves. All other details of the replay check remain the same in this alternate embodiment.

The technique of this disclosure provides for a PoW as an authorization signal architecture that enables an end user to access protected endpoints (sites, applications, processes, documents, or the like) using one or more authorization proxies. Conveniently, any of the above-described processing may be implemented a SaaS-based manner, typically leveraging a cloud computing infrastructure. As used herein, the term "site" typically refers to a website (or some protected portion thereof), but the reference to a "site" should be broadly construed to refer to any protected resource available from a server or other computing entity. The resource may be the overall site, a portion of the site, a page, an application that opens up a webpage to do a token-based authentication, a document or other file, or a single object. An architecture of this type thus comprises a network-accessible service (e.g., a web application), typically implemented as a set of configurable computing resources (e.g. networks, network bandwidth, servers, processing, memory, storage, applications, virtual machines, and services), Typically, the service is multi-tenant based, and it is provided on behalf of a service customer (an organization) that desires to enables its end users to obtain secure access to the organization's protected resources hosted on one or more servers. The service typically is implemented as an adjunct to the organization's existing authentication process flow. In a variant embodiment, the service may be directly integrated with the organization's authentication process flow.

Thus, and according to the above-described process flow, the principles of PoW-based authorization are employed to block a device from accessing an organization's SaaS applications or other resources if it is cannot provide a suitable response to a work challenge. There is no requirement that the client be changed.

In addition to performing (or attempting to perform the work identified by the PoW challenge), the client may be configured to perform any number of other device and security checks. The particular nature and scope of these checks is not a limitation of this disclosure.

Enabling Technologies

The following provides a description of an edge network-based operating environment in which the techniques of this disclosure may be practiced. This operating environment is not intended to be limiting.

In a known system, a distributed computer system is configured as a content delivery network (CDN) and is assumed to have a set of edge machines distributed around the Internet. Typically, most of the machines are servers located near the edge of the Internet, i.e., at or adjacent end user access networks, and thus sometimes referred to herein as an "edge network." A network operations command center (NOCC) 704 manages operations of the various machines in the system. Third party sites, such as web site or application, offload delivery of content (e.g., HTML, embedded page objects, streaming media, software downloads, and the like) to the distributed computer system and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system that collects usage and other data from the edge servers, aggregates that data across a region or set of regions, and passes that data to other back-end systems to facilitate monitoring, logging, alerts, billing, management and other operational and administrative functions. Distributed network agents monitor the network as well as the server loads and provide network, traffic and load data to a DNS query handling mechanism, which is authoritative for content domains being managed by the CDN. A distributed data transport mechanism may be used to distribute control information (e.g., metadata to manage content, to facilitate load balancing, and the like) to the edge servers.

A machine comprises commodity hardware running an operating system kernel (such as Linux) that supports one or more applications. To facilitate content delivery services, for example, given machines typically run a set of applications, such as an HTTP proxy (sometimes referred to as a "global host" process), a name server, a local monitoring process, a distributed data collection process, and the like. An authorization server may execute as a program or process on a physical machine of this type, or on a virtual machine (VM) when the techniques herein are practiced in or in association with a cloud environment.

In an edge network-based embodiment, a CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, which provide the functionality of a given system or subsystem. As described, the functionality may be implemented in a stand-alone machine, or across a distributed set of machines. The functionality may be provided as a service, e.g., as a SaaS solution.

The techniques herein may be implemented in a computing platform, although other implementations may be utilized as well. One or more functions of the computing platform (e.g., the control plane) may be implemented conveniently in a cloud-based architecture. As is well-known, cloud computing is a model of service delivery for enabling on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Available services models that may be leveraged in whole or in part include Software as a Service (SaaS) (the provider's applications running on cloud infrastructure), Platform as a service (PaaS) (the customer deploys applications that may be created using provider tools onto the cloud infrastructure), and Infrastructure as a Service (IaaS) (customer provisions its own processing, storage, networks and other computing resources and can deploy and run operating systems and applications).

A client a CPU (central processing unit), computer memory, such as RAM, and a drive. The device software includes an operating system, and generic support applications and utilities.

The cloud service is a technology platform that may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the cloud service comprises a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, which provide the functionality of a given system or subsystem. As described, the functionality may be implemented in a standalone machine, or across a distributed set of machines.

The computing entity on which the browser run may be any network-accessible computing entity that is other than the mobile device that runs the authenticator app itself. Representative entities include laptops, desktops, workstations, other mobile devices or machines associated with such other mobile devices, and the like.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

Any described commercial products, systems and services are provided for illustrative purposes only and are not intended to limit the scope of this disclosure.

The techniques herein provide for improvements to technology or technical field, namely, cloud-based access control, as well as improvements to various technologies such as secure authentication, and the like, all as described.

What is claimed is as follows:

1. A method to control access to a protected resource from a client device associated with a user, comprising:
    at a given one of a set of one or more authorization proxies, and during an authorization flow initiated from the client device by a request and that seeks access to the protected resource:
        issuing a Proof of Work (PoW) challenge to the client device, the PoW challenge requiring given work to be performed on the client device within a given time window, together with an identifier uniquely associated with the given one of the set of one or more authorization proxies;
        responsive to issuance of the PoW challenge, receiving a communication from the client device that includes given data;
        determining whether the given data includes the identifier uniquely associated with the given one of the set of authorization proxies;
        based on a determination that the given data includes the identifier uniquely associated with the given one of the set of authorization proxies, determining whether the request should be forwarded to the protected resource for handling; and
        taking a given action based on the determining whether the request should be forwarded to the protected resource for handling.

2. The method as described in claim 1, wherein the given action forwards the request to the protected resource for handling based on a determination that the given work was performed within the given time window.

3. The method as described in claim 1, wherein the given action forwards the request to the protected resource for handling based on a determination that the given work was not performed with the given time window but that the client device has completed a further authentication.

4. The method as described in claim 1, wherein the given action denies or sandboxes the request based on a determination that the given work was not performed with the given time window.

5. The method as described in claim 1, further including receiving a response from the protected resource, and forwarding that response back to the client device as a response to the request.

6. The method as described in claim 1, wherein the PoW challenge is issued to the client device from a first authorization proxy of the set, and the communication is received from the client device at the first authorization proxy.

7. The method as described in claim 1, wherein the client device is associated with a specific user or a class of users.

8. A method to control access to a protected resource from a client device associated with a user, comprising:
    configuring two or more authorization proxies, each of the authorization proxies responsible for controlling access to the protected resource;
    at a first authorization proxy:
        receiving from the client device a response to a Proof of Work (PoW) challenge, together with an identifier uniquely identifying a given authorization proxy;
        determining whether the identifier uniquely identifies the first authorization proxy;
        when the identifier uniquely identifies the first authorization proxy, forwarding the request to the protected resource; and
        when the identifier does not uniquely identify the first authorization proxy, determining whether a second authorization proxy issued the PoW challenge and whether the response to the PoW challenge was timely received.

9. The method as described in claim 8, further including forwarding the request to the protected resource upon determining that the second authorization proxy issued the PoW challenge and that the response to the PoW challenge was timely received.

10. The method as described in claim 8, further including denying the request upon determining that the second authorization proxy issued the PoW challenge but the response to the PoW challenge was not timely received.

11. The method as described in claim 9, wherein determining whether the second authorization proxy issued the PoW challenge includes checking a queue of PoW challenges, wherein each PoW challenge in the queue has an associated timestamp and an identifier that identifies the authorization proxy that issued the PoW challenge.

12. The method as described in claim 11, wherein the queue of PoW challenges is associated with one of: a replay check node, and the two or more authorization proxies.

13. The method as described in claim 11, further including instructing the queue to delete the PoW challenge from the queue after forwarding the request to the protected resource.

14. The method as described in claim 8, wherein the request is forwarded to the protected resource when the response to the PoW challenge is timely received at the first authorization proxy.

15. The method as described in claim 8, wherein the response to the PoW challenge indicates that the client device is associated with a specific user or a class of users.

16. A method to control access to a protected resource from a client device associated with a user, comprising:

at a given one of a set of one or more authorization proxies, and during an authorization flow initiated from the client device by a request and that seeks access to the protected resource:

issuing a Proof of Work (PoW) challenge to the client device, together with at least one additional signal uniquely associated to a given characteristic of the client device, the PoW challenge requiring given work to be performed on the client device within a given time window;

receiving a communication from the client device; and forwarding the request to the protected resource when the response includes a timely response to the PoW challenge together with a response to the at least one additional signal.

\* \* \* \* \*